United States Patent
Fujisawa et al.

(10) Patent No.: US 9,979,468 B2
(45) Date of Patent: May 22, 2018

(54) OPTICAL COMMUNICATION SYSTEM, OPTICAL NODE DEVICE, AND OPTICAL PATH SETTING METHOD

(71) Applicant: NEC Corporation, Tokyo (JP)

(72) Inventors: Shinsuke Fujisawa, Tokyo (JP); Hitoshi Takeshita, Tokyo (JP); Tomoyuki Hino, Tokyo (JP); Akio Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days. days.

(21) Appl. No.: 15/513,450

(22) PCT Filed: Sep. 15, 2015

(86) PCT No.: PCT/JP2015/004702
§ 371 (c)(1),
(2) Date: Mar. 22, 2017

(87) PCT Pub. No.: WO2016/047101
PCT Pub. Date: Mar. 31, 2016

(65) Prior Publication Data
US 2017/0302370 A1 Oct. 19, 2017

(30) Foreign Application Priority Data
Sep. 25, 2014 (JP) .................................. 2014-195303

(51) Int. Cl.
*H04B 10/03* (2013.01)
*H04Q 11/00* (2006.01)
*H04B 10/40* (2013.01)

(52) U.S. Cl.
CPC ............. *H04B 10/03* (2013.01); *H04B 10/40* (2013.01); *H04Q 11/0062* (2013.01); *H04Q 2011/0073* (2013.01); *H04Q 2011/0081* (2013.01)

(58) Field of Classification Search
CPC .... H04B 10/03; H04B 10/40; H04Q 11/0062; H04Q 2011/0073; H04Q 2011/0081
See application file for complete search history.

(56) References Cited

U.S. PATENT DOCUMENTS 7,218,851 B1* 5/2007 Zang .................... H04B 10/032
398/25
2004/0037566 A1* 2/2004 Willebrand ........ H04B 10/1123
398/115

(Continued)

FOREIGN PATENT DOCUMENTS

JP 2003-224585 A 8/2003
JP 2006-033319 A 2/2006

(Continued)

OTHER PUBLICATIONS

International Search Report corresponding to PCT/JP2015/004702 dated Oct. 20, 2015 (2 pages).

(Continued)

*Primary Examiner* — Danny Leung
(74) *Attorney, Agent, or Firm* — Wilmer Cutler Pickering Hale and Dorr LLP

(57) ABSTRACT

It is difficult in an optical network to achieve fault recovery in case of multiple failures without decreasing the usage efficiency of the optical network; therefore, an optical communication system according to an exemplary aspect of the present invention includes an optical network management device including an optical path setting means for setting, to a physical route differing from each other, a backup path corresponding to each of a plurality of active paths on an identical physical route, and a failure-case optical path setting means for setting a failure-case backup path with a compressed band of the backup path, to a physical route without a failure in a case where failures arising on more than one physical route among the physical routes; and an (Continued)

optical node device including an optical transceiver means for transmitting and receiving optical signals using failure-case backup path information resulting from setting by the failure-case optical path setting means.

20 Claims, 12 Drawing Sheets

(56) References Cited

U.S. PATENT DOCUMENTS

| | | | | |
|---|---|---|---|---|
| 2009/0232492 A1* | 9/2009 | Blair | ............... | H04J 14/0206 398/5 |
| 2014/0126355 A1* | 5/2014 | Filsfils | ............... | H04L 45/66 370/225 |
| 2014/0147106 A1* | 5/2014 | Ahuja | ............... | H04B 10/032 398/5 |
| 2015/0138961 A1* | 5/2015 | Wijnands | ............... | H04L 41/0668 370/228 |
| 2015/0180579 A1* | 6/2015 | Tajima | ............... | H04B 10/40 398/135 |
| 2015/0326427 A1* | 11/2015 | Ali | ............... | H04L 12/64 370/228 |
| 2015/0334004 A1* | 11/2015 | Hussain | ............... | H04L 1/0042 398/5 |
| 2017/0302370 A1* | 10/2017 | Fujisawa | ............... | H04B 10/03 |

FOREIGN PATENT DOCUMENTS

| | | |
|---|---|---|
| JP | 2008-301509 A | 12/2008 |
| JP | 2010-166328 A | 7/2010 |
| JP | 2013-243559 A | 12/2013 |
| JP | 2014-045463 A | 3/2014 |

OTHER PUBLICATIONS

Gangxiang Shen et al., "Optimal Design for Shared Backup Path Protected Elastic Optical Networks Under Single-Link Failure," IEEE/OSA Journal of Optical Communications and Networking, Jul. 2014, vol. 6, Issue 7, ISSN 1943-0620, pp. 649-659.

Menglin Liu et al., "Survivable Traffic Grooming in Elastic Optical Networks—Shared Protection," Journal of Lightwave Technology, 2013, vol. 31, No. 6, ISSN 0733-8724, pp. 903-909.

* cited by examiner

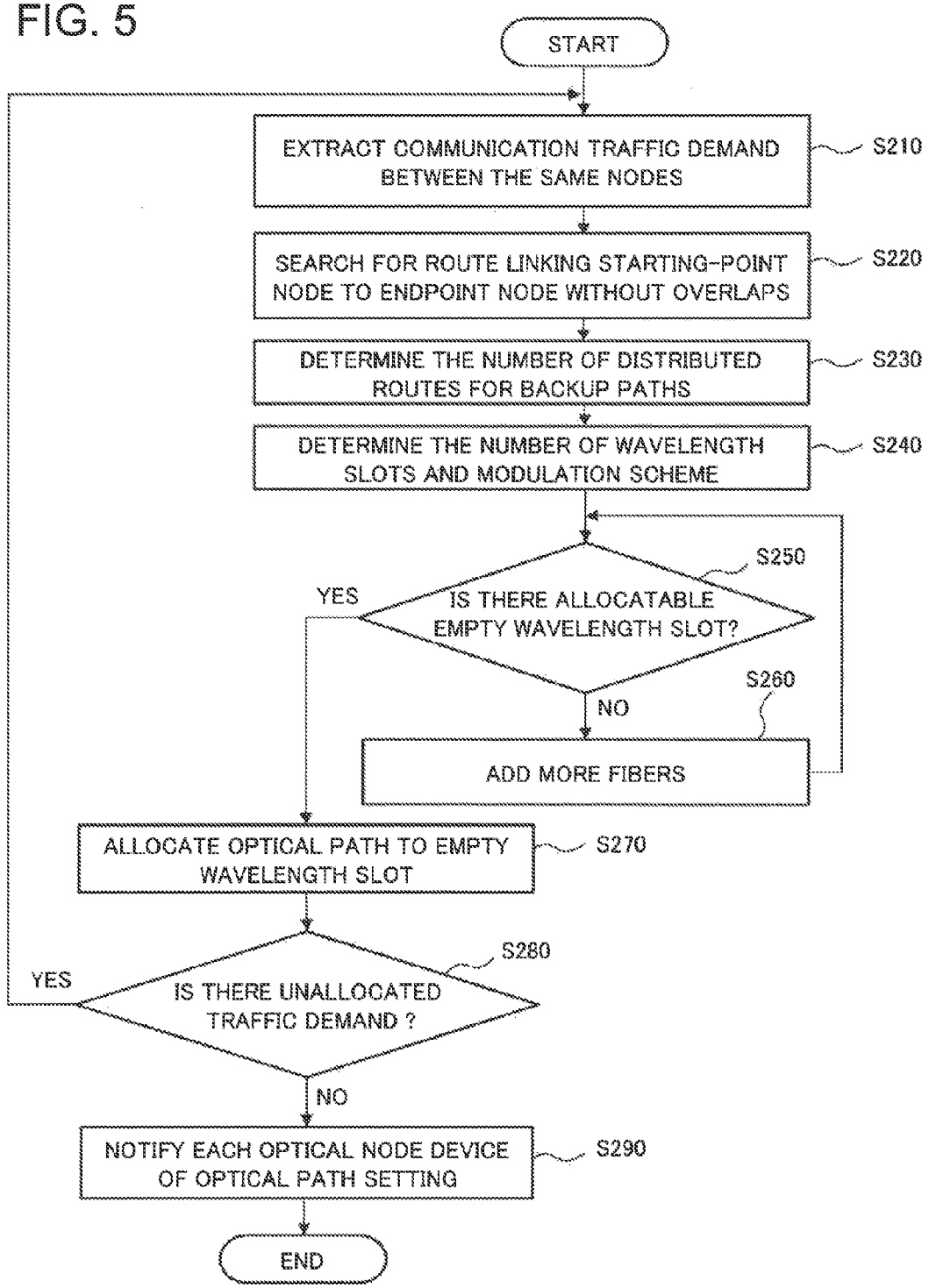

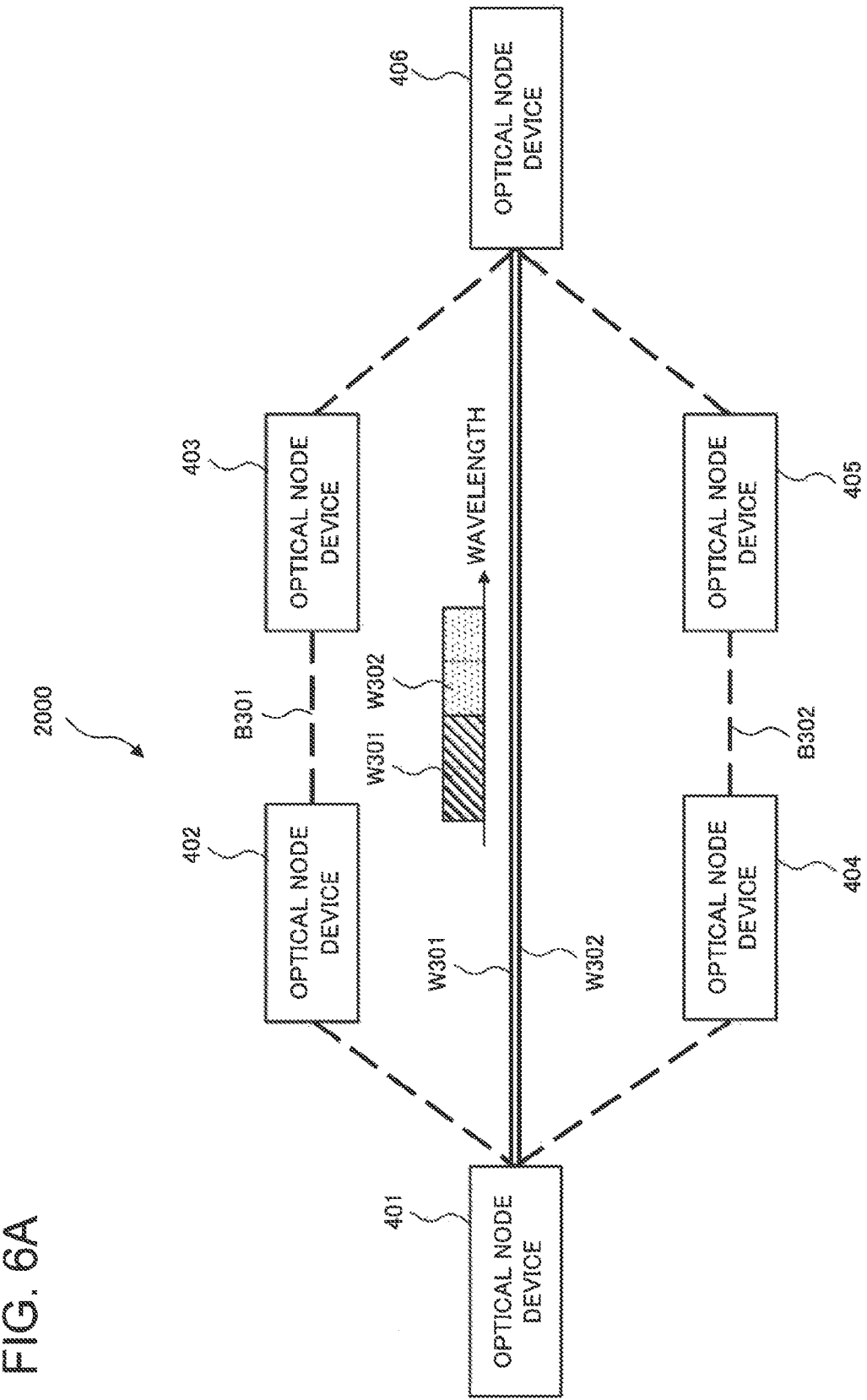

FIG. 7

| TRAFFIC DEMAND | ACTIVE PATH | BACKUP PATH | BANDWIDTH GUARANTEED RATE UNDER MULTIPLE FAILURES |
|---|---|---|---|
| W301 / B301 | 401-406 | 401-402-403-406 | 50% |
| W302 / B302 | 401-406 | 401-404-405-406 | 50% |

FIG. 10

| FAILURE OCCURRENCE PATTERN | FAULTY PATH | BANDWIDTH GUARANTEED RATE | WAVE-LENGTH SLOT | FAILURE RECOVERY ROUTE |
|---|---|---|---|---|
| 1-1 | W301 | 100% | λ1, λ2 | 401-402-403-406 |
| 1-2 | W302 | 100% | λ1, λ2 | 401-404-405-406 |
| 2-1 | W301 | 100% | λ1, λ2 | 401-402-403-406 |
|  | W302 | 100% | λ1, λ2 | 401-404-405-406 |
| 3-1 | W301 | 50% | λ2 | 401-404-405-406 |
|  | W302 | 50% | λ1 | 401-404-405-406 |
|  | B301 |  |  |  |
| 3-2 | W301 | 50% | λ1 | 401-402-403-406 |
|  | W302 | 50% | λ2 | 401-402-403-406 |
|  | B302 |  |  |  |

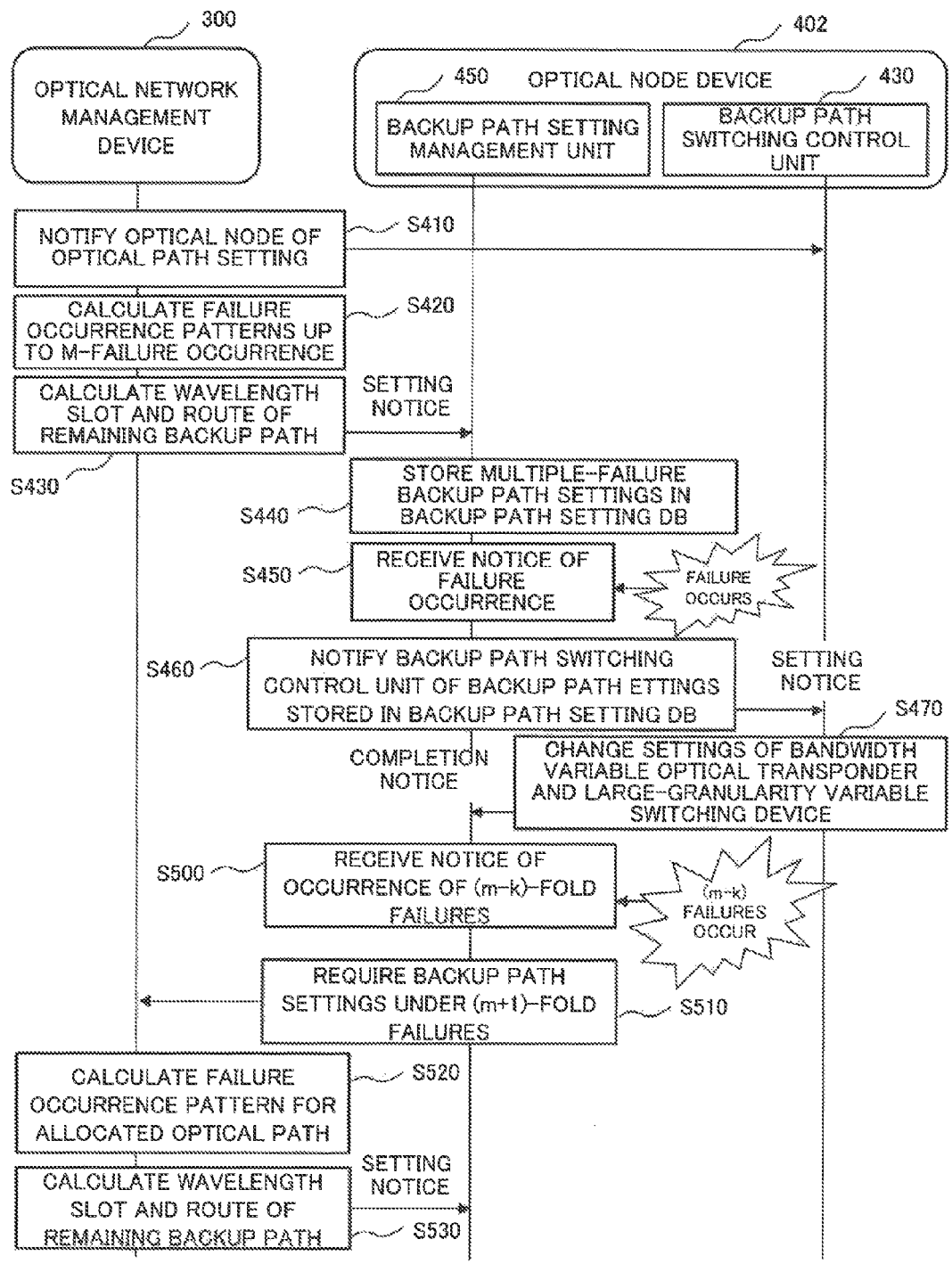

OPTICAL COMMUNICATION SYSTEM, OPTICAL NODE DEVICE, AND OPTICAL PATH SETTING METHOD

CROSS-REFERENCE TO RELATED APPLICATIONS

This application is a national stage application of International Application No. PCT/JP2015/004702 entitled "Optical Communication System, Optical Node Device, and Optical Path Setting Method" filed on Sep. 15, 2015, which claims priority to Japanese Application No. 2014-195303 filed on Sep. 25, 2014, the disclosures of which are hereby incorporated by reference in their entirety.

TECHNICAL FIELD

The present invention relates to optical communication systems, optical node devices, and optical path setting methods, in particular, to an optical communication system, an optical node device, and an optical path setting method that are used in an optical backbone network.

BACKGROUND ART

An optical backbone network provides the functionality of communicating traffic of a client device through an optical fiber communication channel that connects nodes in accordance with a contract service quality (a service class). The optical backbone network receives a client signal through an interface between a node device and a client device. A plurality of client signals are multiplexed in a variety of multiplexing schemes, and then the signals are transmitted through a backbone transmission link with a larger capacity. Multiplexing schemes to be used include Wavelength Division Multiplexing (WDM), Time Division Multiplexing (TDM), Orthogonal Frequency Division Multiplexing (OFDM), or the like.

In optical backbone networks, ultrahigh capacity traffic with 100 Gbps (Giga bit per second) grade per channel is transmitted. Consequently, a fault recovery technique for failures due to an optical fiber disconnection or a breakdown of an optical node device, and a technique to improve the usage efficiency of optical frequency resources, become important in the optical backbone network.

The 1+1 protection system and the shared protection system are known as the fault recovery technique, and an example of those fault recovery techniques is described in Patent Literature 1.

A signal switching device described in Patent Literature 1 includes a signal switching unit, a branching unit to branch a user signal for redundancy, and a device monitoring control unit to monitor and control the entire device. The signal switching device transmits user signals to another signal switching device through an active route, a first backup route, and a second backup route. The other signal switching device receives the signals through the above-described routes, a signal monitoring unit monitors signal conditions in the active route and the backup routes, and a selecting unit selects and outputs a normal signal to a user device.

The signal switching unit is set to connect with the active route when the active route is normal. If failures occur in the active route, the selection unit in the switching device at the receiving side selects a signal transmitted through the first backup route and outputs it to the user device.

The signal monitoring unit in the backup path monitors the first backup route. When the signal monitoring unit detects a failure such as a signal disruption and an excess of threshold of error rate in the signal from the first backup route, the device monitoring control unit controls the signal switching unit to switch the connection from the first backup route to the second backup route.

It is said that the configuration described above can always keep a backup system working normally; consequently, a highly reliable 1+1 redundant configuration can be implemented that is capable of dealing with double failures in a device or a transmission link between transmitting and receiving nodes.

On the other hand, the elastic optical network system has been proposed in order to utilize efficiently optical frequency resources (see Patent Literature 2, for example). It is possible in the elastic optical network system to allocate the minimum necessary frequency band depending on the transmission capacity of the optical signal to a route between nodes through which the optical signal is transmitted and received on a network in which a plurality of nodes are connected through optical fibers. In addition, it is possible in the elastic optical network system to determine a frequency bandwidth to be allocated flexibly by the number of slots using a preset frequency width as a unit of a slot.

As mentioned above, according to the elastic optical network system, it is possible to change the required number of wavelength slots for an optical path depending on the required capacity of the traffic. This makes it possible to allocate optical paths to redundant wavelength resources that cannot be utilized in conventional networks with fixed grid, and improve the usage efficiency of the optical network.

Related techniques include techniques described in Patent Literature 3 to Patent Literature 5.

CITATION LIST

Patent Literature

PTL 1: Japanese Patent Application Laid-Open Publication No. 2008-301509
PTL 2: Japanese Patent Application Laid-Open Publication No. 2014-045463
PTL 3: Japanese Patent Application Laid-Open Publication No. 2010-166328
PTL 4: Japanese Patent Application Laid-Open Publication No. 2006-033319
PTL 5: Japanese Patent Application Laid-Open Publication No. 2003-224585

SUMMARY OF INVENTION

Technical Problem

The above-mentioned fault recovery technique is configured to provide the first backup route and the second backup route with respect to the active route. Specifically, a plurality of backup paths are set in advance in case that failures simultaneously occur at multiple sites, and the impact of the failures is avoided by switching to a backup path that survives when the failure occurs.

In this case, wavelength resources are required for providing three or more optical paths in order to accommodate one traffic demand. As a result, there has been the problem that the usage efficiency of an optical network significantly decreases.

As mentioned above, there has been the problem that it is difficult in an optical network to achieve fault recovery in case of multiple failures without decreasing the usage efficiency of the optical network.

The object of the present invention is to provide an optical communication system, an optical node device, and an optical path setting method that solve the above-mentioned problem that it is difficult in an optical network to achieve fault recovery in case of multiple failures without decreasing the usage efficiency of the optical network.

Solution to Problem

An optical communication system according to an exemplary aspect of the present invention includes an optical network management device including an optical path setting means for setting, to a physical route differing from each other, a backup path corresponding to each of a plurality of active paths on an identical physical route, and a failure-case optical path setting means for setting a failure-case backup path with a compressed band of the backup path, to a physical route without a failure in a case where failures arising on more than one physical route among the physical routes; and an optical node device including an optical transceiver means for transmitting and receiving optical signals using failure-case backup path information resulting from setting by the failure-case optical path setting means.

An optical network management device according to an exemplary aspect of the present invention includes an optical path setting means for setting, to a physical route differing from each other, a backup path corresponding to each of a plurality of active paths on an identical physical route; and a failure-case optical path setting means for setting a failure-case backup path with a compressed band of the backup path, to a physical route without a failure in a case where failures arising on more than one physical route among the physical routes.

An optical node device according to an exemplary aspect of the present invention includes a failure-case backup path information accepting means for accepting failure-case backup path information; and an optical transceiver means for transmitting and receiving optical signals using the failure-case backup path information; wherein the failure-case backup path information results from setting a failure-case backup path with a compressed band of the backup path to a physical route without a failure, in a case where a backup path corresponding to each of a plurality of active paths on an identical physical route is set to a physical route differing from each other, and a case where failures arising on more than one physical route among the physical routes.

An optical path setting method according to an exemplary aspect of the present invention includes setting, to a physical route differing from each other, a backup path corresponding to each of a plurality of active paths on an identical physical route; and setting a failure-case backup path with a compressed band of the backup path, to a physical route without a failure in a case where failures arising on more than one physical route among the physical routes.

An optical communication method according to an exemplary aspect of the present invention includes setting, to a physical route differing from each other, a backup path corresponding to each of a plurality of active paths on an identical physical route; setting a failure-case backup path with a compressed band of the backup path, to a physical route without a failure in a case where failures arising on more than one physical route among the physical routes; and transmitting and receiving optical signals using failure-case backup path information resulting from setting the failure-case backup path.

Advantageous Effects of Invention

According to the optical communication system, the optical node device, and the optical path setting method of the present invention, it is possible to achieve fault recovery in case of multiple failures without decreasing the usage efficiency of the optical network.

BRIEF DESCRIPTION OF DRAWINGS

FIG. 5 is a flowchart for illustrating the operation of the optical network management device according to the second example embodiment of the present invention.

FIG. 6A is a diagram schematically illustrating a configuration of the optical communication system in a normal state according to the second example embodiment of the present invention.

FIG. 7 is a table illustrating configurations depending on traffic demands in the optical communication system according to the second example embodiment of the present invention.

FIG. 10 is a table illustrating examples of the contents recorded in a backup path setting DB included in an optical node device constituting the optical communication system according to the third example embodiment of the present invention.

FIG. 11 is a sequence diagram for illustrating a failure recovery operation in the optical communication system according to the third example embodiment of the present invention.

EXAMPLE EMBODIMENT

Figure 1:
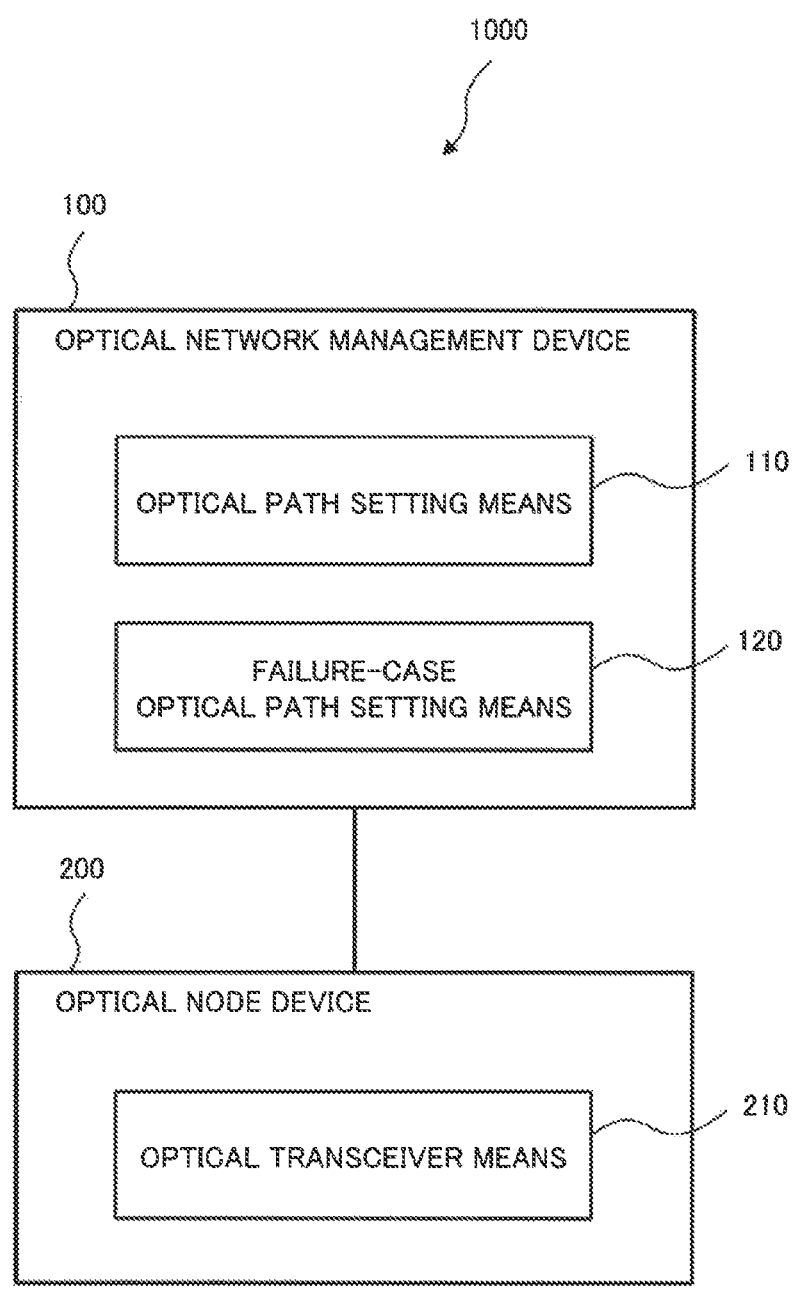
FIG. 1 is a block diagram illustrating a configuration of an optical communication system according to a first example embodiment of the present invention.

Example embodiments of the present invention will be described below with reference to the drawings. The directions of arrows in the drawings are illustrative and do not limit the directions of signals between blocks.

A First Example Embodiment

FIG. 1 is a block diagram illustrating a configuration of an optical communication system 1000 according to a first example embodiment of the present invention. The optical communication system 1000 includes an optical network management device 100 and an optical node device 200.

The optical network management device 100 includes an optical path setting means 110 and a failure-case optical path setting means 120. The optical path setting means 110 sets, to a physical route differing from each other, a backup path corresponding to each of a plurality of active paths on an identical physical route. The failure-case optical path setting means 120 sets a failure-case backup path with a compressed band of a backup path, to a physical route without a failure in a case where failures arising on more than one physical route among the physical routes.

The optical node device 200 includes an optical transceiver means 210 for transmitting and receiving optical signals using failure-case backup path information resulting from setting by the failure-case optical path setting means 120.

Next, an optical path setting method according to the present example embodiment will be described. In the optical path setting method according to the present example embodiment, first, a backup path corresponding to each of a plurality of active paths on an identical physical route is sets to a physical route differing from each other. And a failure-case backup path with a compressed band of a backup path is set to a physical route without a failure in a case where failures arising on more than one physical route among the physical routes.

As mentioned above, in the optical communication system 1000 and the optical path setting method according to the present example embodiment, a plurality of physical routes are set in advance as candidates for physical routes of backup paths, and each backup path is dispersedly disposed. If failures simultaneously occur on a plurality of physical routes, the optical bandwidth of the backup path is compressed to accommodate the damaged optical paths. This makes it possible to achieve fault recovery in case of multiple failures without decreasing the usage efficiency of the optical network.

The optical path setting means 110 can be configured to set a plurality of backup paths for each of a plurality of active paths to physical routes that have substantially equal communication quality. The failure-case optical path setting means 120 can be configured to compress the bandwidth of the backup path based on a bandwidth guaranteed rate under multiple failures.

A Second Example Embodiment

Figure 2:
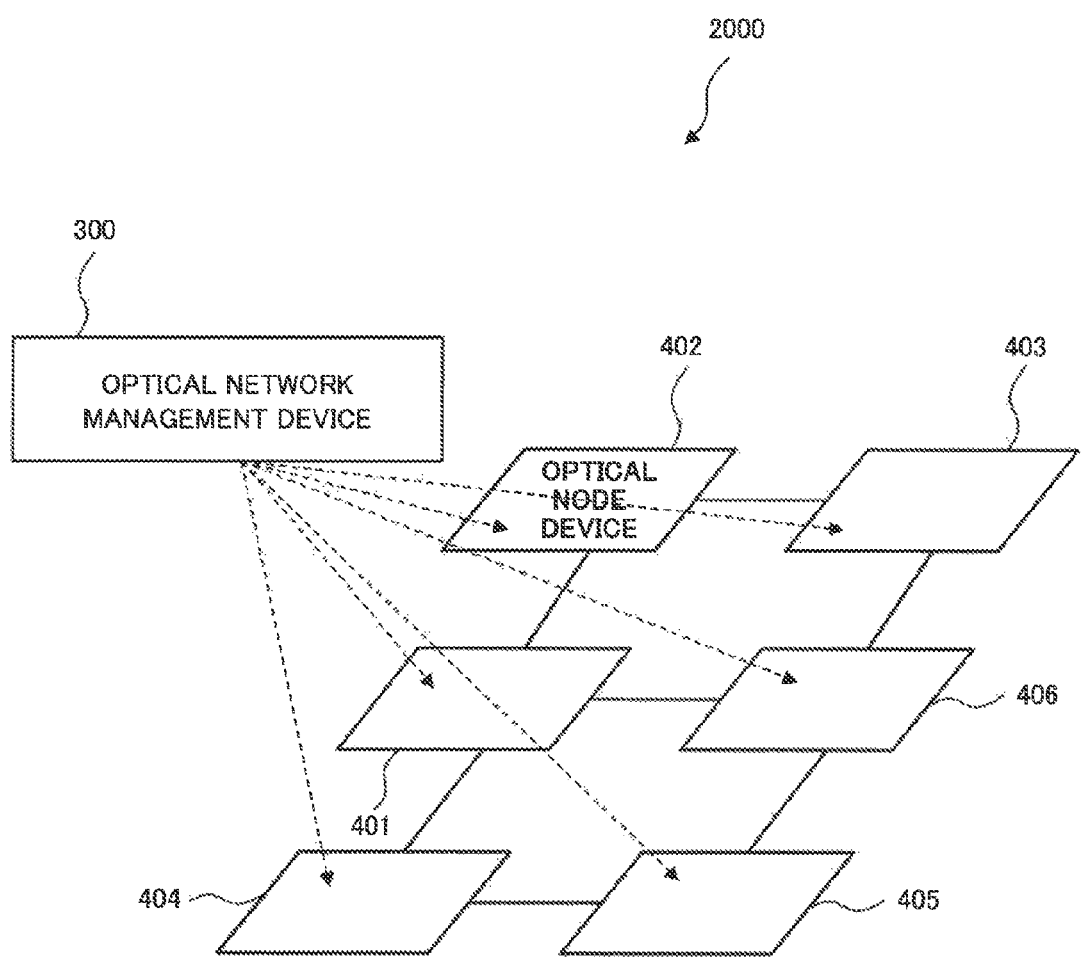
FIG. 2 is a diagram illustrating a schematic configuration of an optical communication system according to a second example embodiment of the present invention.

Next, a second example embodiment of the present invention will be described. FIG. 2 illustrates a schematic configuration of an optical communication system 2000 according to the present example embodiment. As illustrated in FIG. 2, the optical communication system 2000 includes an optical network management device 300 and optical node devices 401 to 406, which are interconnected through optical fiber communication channels.

Figure 3:
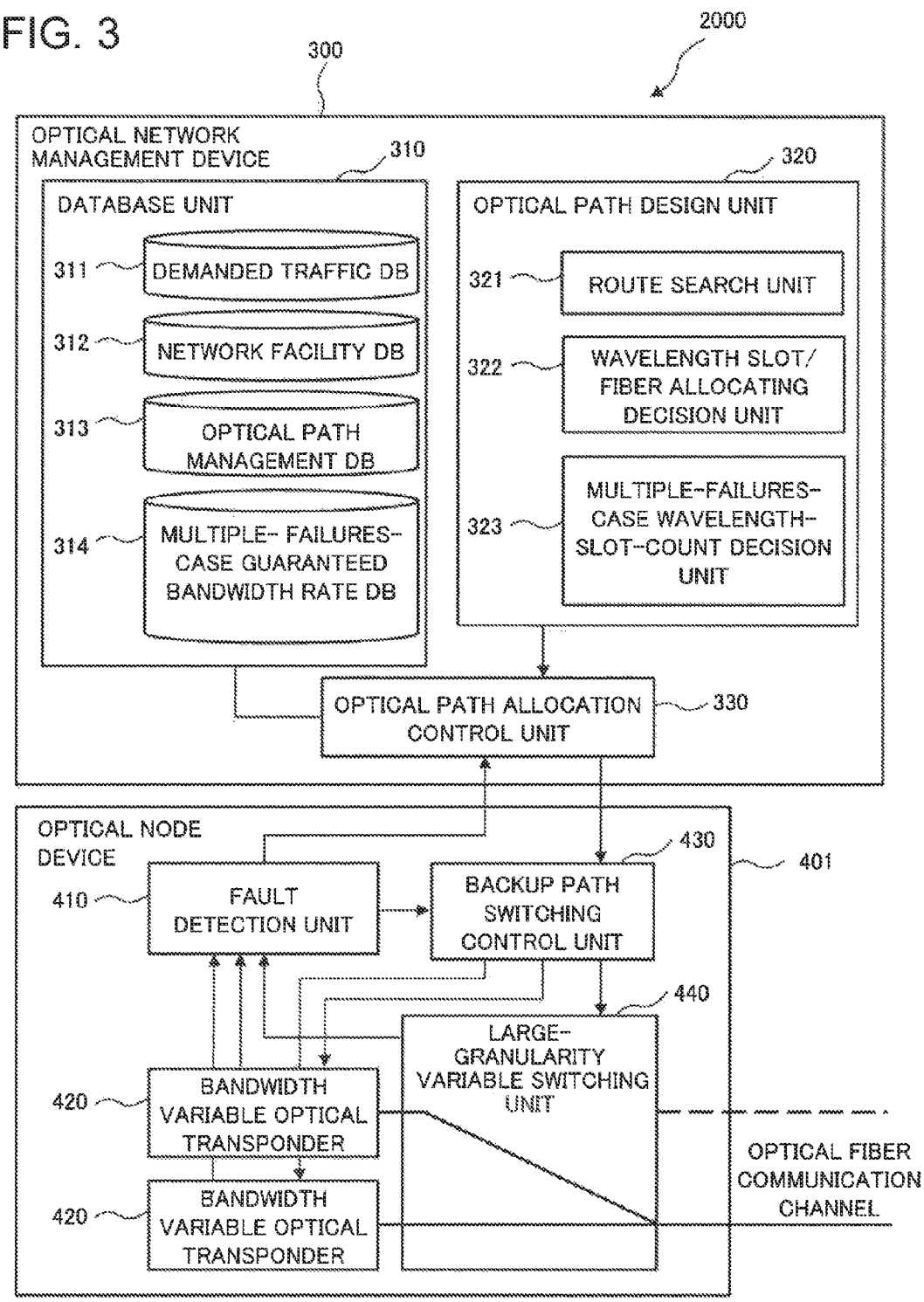
FIG. 3 is a block diagram illustrating configurations of an optical network management device and an optical node device that constitute the optical communication system according to the second example embodiment of the present invention.

FIG. 3 illustrates configurations of the optical network management device 300 and the optical node device 401 that constitute the optical communication system 2000 according to the present example embodiment.

The optical network management device 300 includes a database unit 310, an optical path design unit 320, and an optical path allocation control unit 330.

The database unit 310 includes a demanded traffic database (DB) 311, a network facility DB 312, an optical path management DB 313, and a multiple-failures-case bandwidth guaranteed rate DB 314. The optical path design unit 320 includes a route search unit 321, a wavelength slot/fiber allocating decision unit 322, and a multiple-failures-case wavelength-slot-count decision unit 323. The route search unit 321 and the wavelength slot/fiber allocating decision unit 322 constitute an optical path setting means, and the multiple-failures-case wavelength-slot-count decision unit 323 constitutes a failure-case optical path setting means.

The optical node device 401, on the other hand, includes a fault detection unit 410, bandwidth variable optical transponders 402, a backup path switching unit 430, and a large-granularity variable switching device 440. The bandwidth variable optical transponders 420 and the large-granularity variable switching device 440 constitute an optical transceiver means.

The optical path allocation control unit 330 included in the optical network management device 300 is connected to the fault detection unit 410 and the backup path switching control unit 430 included in each optical node device. The optical path allocation control unit 330 constitutes an optical path allocation control means, which notifies the optical node device 401 of failure-case backup path information resulting from setting by the failure-case optical path setting means 120. The backup path switching control unit 430 constitutes a failure-case backup path information accepting means, which accepts failure-case backup path information.

Figure 4:
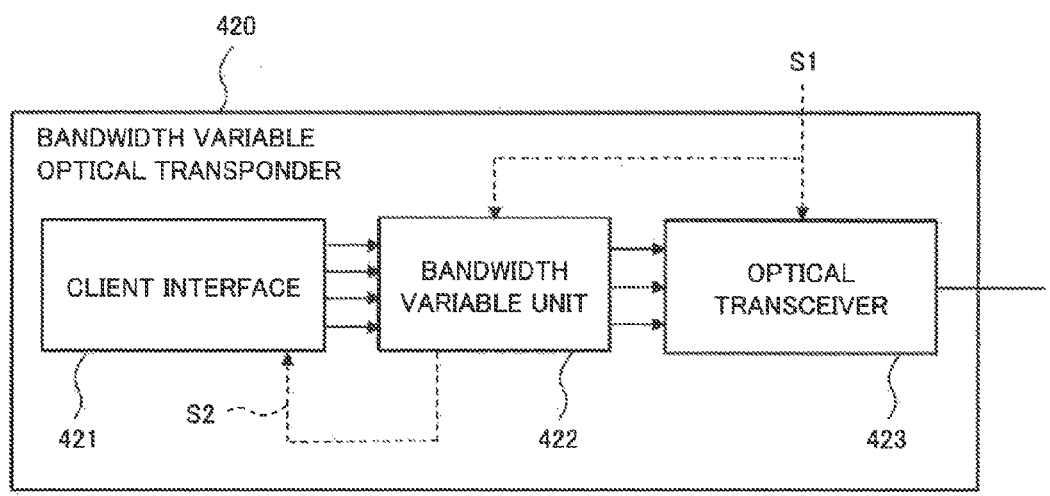
FIG. 4 is a block diagram illustrating a configuration of a bandwidth variable optical transponder included in an optical node device constituting the optical communication system according to the second example embodiment of the present invention.

FIG. 4 illustrates a configuration of the bandwidth variable optical transponder 420. The bandwidth variable optical transponder 420 includes a client interface 421, a bandwidth variable unit 422 and, an optical transceiver 423.

When the bandwidth variable optical transponder 420 receives a backup path switching control signal S1 from the backup path switching control unit 430, the bandwidth variable unit 422 changes the number of wavelength slots in accordance with a bandwidth guaranteed rate, and the optical transceiver 423 changes an occupied wavelength slot and a modulation scheme. If the bandwidth guaranteed rate is less than 100%, the bandwidth variable unit 422 sends a back pressure signal S2 to the client interface 421 and performs bandwidth control of a client signal.

The large-granularity variable switching device 440 is connected to an optical fiber communication channel and changes input and output routes with respect to each optical path. An optical cross-connect device, a bandwidth-variable-type wavelength-selective switch, and the like can be used as the large-granularity variable switching device 440, for example.

Next, the operation of the optical network management device 300 according to the present example embodiment will be described. FIG. 5 is a flowchart for illustrating the operation of the optical network management device 300 according to the present example embodiment.

In the optical network management device 300, first, the route search unit 321 extracts a communication traffic demand between the same nodes from the demanded traffic DB 311 in the order it was received (step S210). The route search unit 321 searches for all routes without overlaps (physical routes) by which the starting-point node and the ending-point node regarding the extracted traffic demand are linked, referring to route information stored in the network facility DB 312 (step S220). In this case, a search algorithm such as the k-th shortest path algorithm and the linear programming can be used.

Subsequently, it is determined that the number of distributed routes for backup paths is a smaller value between the number of active paths corresponding to the traffic demands and the number of searched routes (step S230). The number of distributed routes is defined as the number of candidates for the route in a case where backup paths are dispersedly disposed. Disposing backup paths on distributed routes enables the remaining backup paths to accommodate the damaged optical paths even when failures simultaneously occur on a plurality of routes. This makes it possible to achieve fault recovery in case of multiple failures and avoid communication blackout.

Next, the wavelength slot/fiber allocating decision unit 322 determines the number of wavelength slots to accommodate the communication traffic demand and a modulation scheme based on the link quality of each route (step S240). Here, a route with the best link quality is selected as an active path and the remaining routes are selected as backup paths.

The wavelength slot/fiber allocating decision unit 322 checks whether there is an empty wavelength slot to establish communication (step S250). If a wavelength slot is lacking (S250/NO), more fibers are added (step S260), and then an optical path is allocated to an empty wavelength slot (step S270). The results of the optical path allocation are stored in the optical path management DB 313.

After the optical path allocation has been determined for all of the traffic demands that the demanded traffic DB 311 manages (step S280/NO), the optical path design unit 320 notifies the optical path allocation control unit 330 of the optical path allocation result. The optical path allocation control unit 330 notifies the respective optical node devices 401 to 406 of the optical path design result (step S290).

Each of the optical node devices 401 to 406 sets its operation based on the optical path design result by the optical network management device 300.

It is preferable for the optical network management device 300 to perform a control so as to allocate backup paths to distributed routes with link qualities becoming substantially equal. This is because the quality of service deteriorates due to a delay between optical paths if the link quality levels for the same service differ. In this case, the modulation scheme on the optical links for the backup path and the like can be set at the same scheme. This makes it possible to decrease the number of management parameters and achieve high-speed switching of optical paths when multiple failures occur.

Next, the failure recovery operation in the optical communication system 2000 according to the present example embodiment will be described.

Figure 6B:
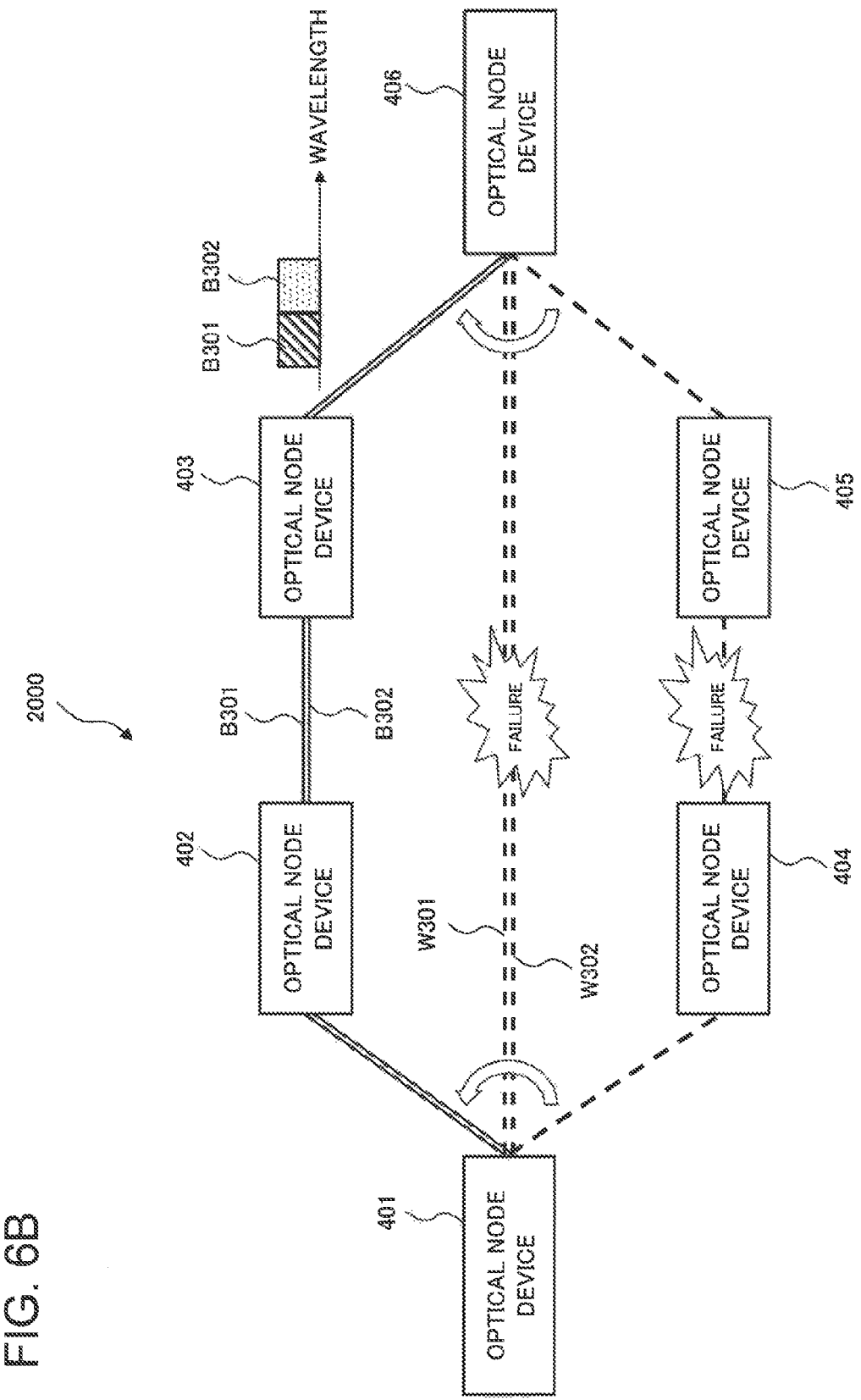
FIG. 6B is a diagram schematically illustrating a configuration of the optical communication system under multiple failures according to the second example embodiment of the present invention.

FIG. 6A and FIG. 6B schematically illustrate the configurations of the optical communication system 2000 according to the present example embodiment. FIG. 6A illustrates the configuration of the optical communication system 2000 in a normal state, and FIG. 6B illustrates the configuration of the optical communication system 2000 under multiple failures.

As illustrated in FIG. 6A, a case will be described as an example in which optical path protection is set for two traffic demands W301 and W302 between the optical node device 401 and the optical node device 406. As illustrated in FIG. 7, backup paths B301 and B302 for the two traffic demands W301 and W302 are allocated to routes that do not overlap with each other. Specifically, the backup path B301 is allocated to a physical route passing through the optical node devices 401, 402, 403 and 406. On the other hand, the optical path B302 is allocated to a physical route passing through the optical node devices 401, 404, 405 and 406.

Figure 8:
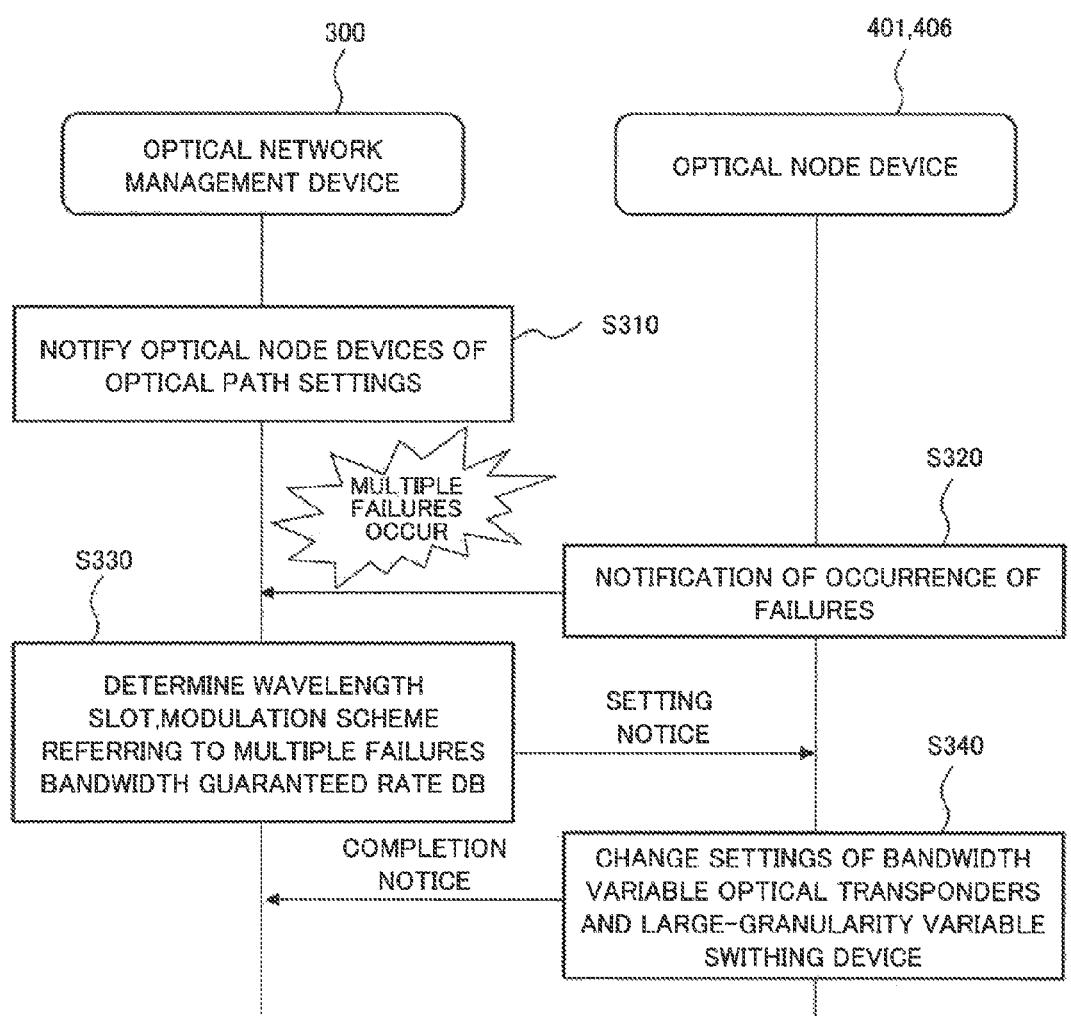
FIG. 8 is a sequence diagram for illustrating a failure recovery operation in the optical communication system according to the second example embodiment of the present invention.

As illustrated in 6B, if failures simultaneously occur on a plurality of routes, that is, a route between the optical node device 401 and the optical node device 406 and a route between the optical node device 404 and the optical node device 405, the active paths W301 and W302 and the backup path B302 are broken. The failure recovery operation in this case will be described using a sequence diagram illustrated in FIG. 8.

The optical network management device 300, first, notifies the respective optical node devices 401 to 406 of optical path settings (step S310). Subsequently, when multiple failures occur, the fault detection unit 410 included in each of the optical node device 401 and the optical node device 406 notifies the optical path allocation control unit 330 in the optical network management device 300 of the occurrence of the failures (step S320). When receiving the notification of the failure, the multiple-failures-case wavelength-slot-count decision unit 323 in the optical network management device 300 determines wavelength slot allocation for backup paths under multiple failures, referring to the multiple-failures-case bandwidth guaranteed rate DB 314 (step S330). The optical path allocation control unit 330 in the optical network management device 300 notifies the backup path switching control unit 430 in the optical node devices 401 and 406 of the set values of the wavelength slot allocation for the backup paths. Then the backup path switching control unit 430 in each of the optical node device 401 and the optical node device 406 controls the bandwidth variable optical transponders 420 and the large-granularity variable switching device 440 and activates the backup paths for the damaged optical paths (step S340).

As illustrated in FIG. 7, it is assumed in the optical communication system 2000 according to the present example embodiment that the multiple-failures-case bandwidth guaranteed rate is set at 50% for each of the active paths W301 and W302. In this case, if the number of wavelength slots for each active path is equal to two, the number of wavelength slots under multiple failures becomes one, which is one half of the number of the wavelength slots for the active path. Consequently, two backup paths having one slot for the active paths W301 and W302 can be accommodated onto a route on which no failure has occurred, that is, the route that passes through the optical node device 402 and the optical node device 403 in FIG. 6B.

In this way, in the optical communication system 2000 according to the present example embodiment, the backup paths are dispersedly disposed on a plurality of physical routes that do not overlap with each other. If failures simultaneously occur on a plurality of physical routes, the damaged backup paths are accommodated by reducing the number of wavelength slots for backup paths in accordance with the multiple-failures-case bandwidth guaranteed rate. This makes it possible to achieve fault recovery in case of multiple failures without decreasing the usage efficiency of the optical network. As a result, communication blackout can be prevented.

If the remaining wavelength resources are lacking for a required number of wavelength slots based on a multiple-failures-case bandwidth guaranteed rate, the communication connectivity can be maintained by setting the wavelength resource to be allocated to each optical path at a value less than or equal to the guaranteed rate. If degrees of priority are assigned to traffic demands, the failure recovery corresponding to the remaining wavelength resources may be performed by discarding the traffic demand with low priority may. In parallel with these processes, the wavelength resources for failure recovery may be secured by means of a restoration method in which the failure recovery is performed by recalculating a route when failures occur. After this, it is possible to redesign the backup path so as to satisfy the condition of the multiple-failures-case bandwidth guaranteed rate.

Instead of the above-mentioned case, if remaining wavelength resources become redundant for the required number of wavelength slots based on a multiple-failures-case bandwidth guaranteed rate, the redundant remaining wavelength resources can be equally divided for each traffic demand and allocated. If the priority is defined for the traffic demand, the remaining wavelength resources may be allocated classifying the weight in accordance with the priority.

A Third Example Embodiment

Figure 9:
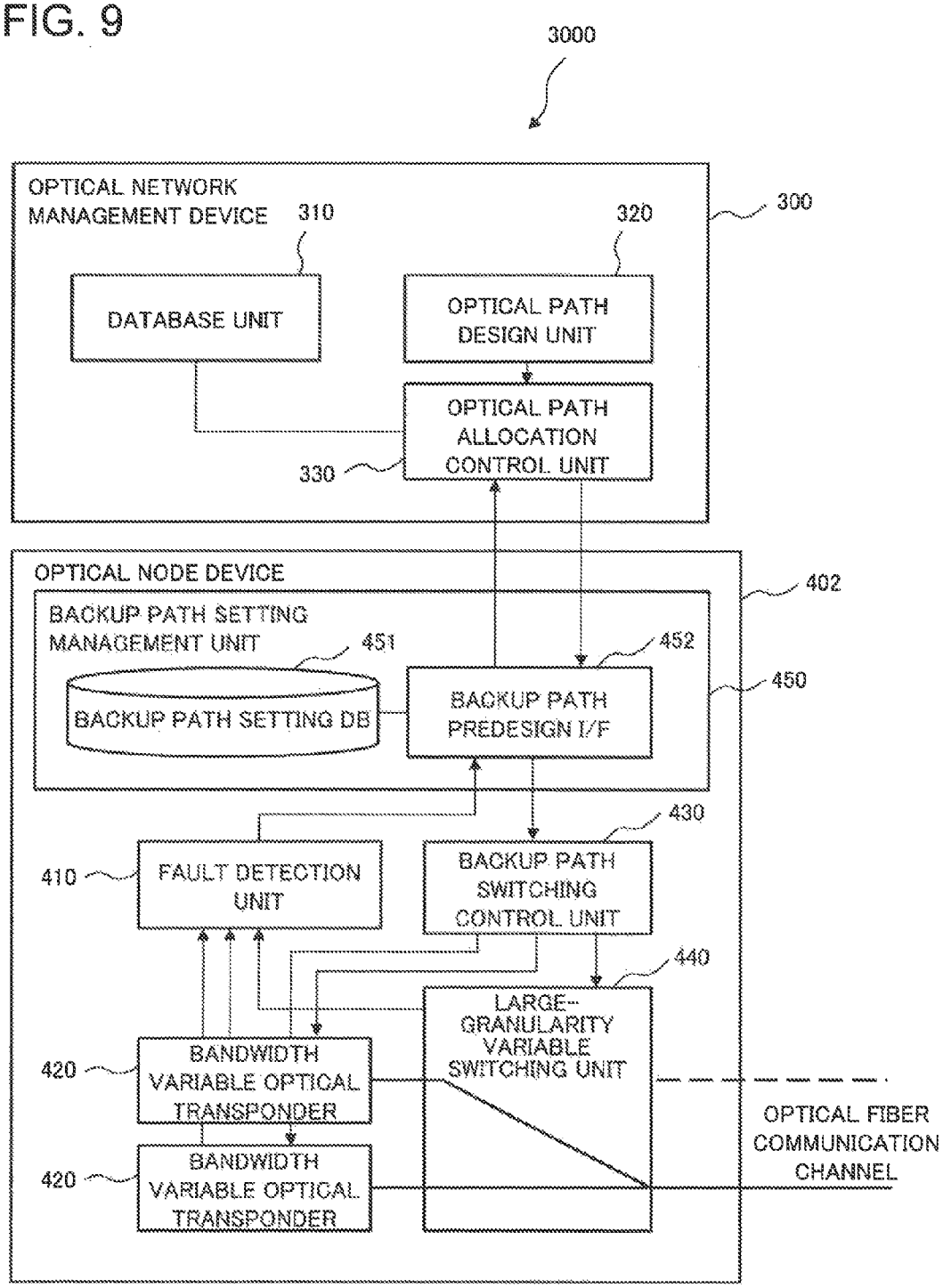
FIG. 9 is a block diagram illustrating configurations of an optical network management device and an optical node device that constitute an optical communication system according to a third example embodiment of the present invention.

Next, a third example embodiment will be described. FIG. 9 illustrates the configurations of an optical network management device 300 and an optical node device 402 that constitute an optical communication system 3000 according to the present example embodiment.

The optical network management device 300 includes a database unit 310, an optical path design unit 320, and an optical path allocation control unit 330. This configuration is the same as that of the optical network management device according to the second example embodiment.

The optical node device 402 includes a fault detection unit 410, bandwidth variable optical transponders 420, a backup path switching control unit 430, and a large-granularity variable switching device 440. The configuration mentioned so far is the same as that of the optical node device 401 according to the second example embodiment. The optical node device according to the present example embodiment further includes a backup path setting management unit 450 in addition to these units.

The backup path setting management unit 450 includes a backup path setting DB 451 and a backup path predesign interface (I/F) 452. The backup path setting DB 451 constitutes a failure-case backup path information recording means and records failure-case backup path information in advance. Using the failure-case backup path information recorded in the backup path setting DB 451 that serves as the failure-case backup path information recording means, the bandwidth variable optical transponders 420 serving as optical transceiver means transmit and receive optical signals.

FIG. 10 illustrates an example of the contents recorded in the backup path setting DB 451. The backup path setting DB 451 holds bandwidth guaranteed rates and required wavelength slots for backup paths, and failure recovery routes, for each possible pattern of failure occurrence. If there are a huge number of patterns of failure occurrence, the optical network management device 300 may be configured to update sequentially the backup path setting DB 431. This makes it possible to avoid an increase in memory capacity of the backup path setting DB 451. The connection port of the large-granularity variable switching device 440 may be recorded as the failure recovery route.

Next, the operation in case of failure of the optical communication system 3000 according to the present example embodiment will be described. FIG. 11 is a sequence diagram to illustrate the operations of the optical network management device 300 and the optical node device 402 included in the optical communication system 3000 according to the present example embodiment.

The optical network management device 300, first, notifies each optical node of the calculated results of optical path setting (step S410). After that, patterns of failure occurrence in the optical path having been allocated to the optical node device 402 are calculated up to m-multiple failure occurrence (step S420). Here, "m" represents an integer larger than or equal to 0, preferably at least 2. The route and the wavelength slot of the remaining path without suffering a failure are calculated for each possible pattern of failure occurrence (step S430). In this case, the route and the wavelength slot of the backup path by which the number of required wavelength slots based on a multiple-failures-case bandwidth guaranteed rate can be secured, among backup path resources, are calculated. The optical network management device 300 notifies the backup path predesign I/F 452 included in the optical node device 402 of the settings of the optical paths for multiple failure recovery. The optical path predesign I/F 452 causes the backup path setting DB 451 to store the settings (step S440).

When the backup path preset I/F 452 receives a notice of failure occurrence from the fault detection unit 410 (step S450), it notifies the backup path switching control unit 430 of a backup path setting that fits a corresponding pattern of failure occurrence, referring to the backup path setting DB 451 (step S460). The backup path switching control unit 430 changes the settings of the bandwidth variable optical transponders 420 and the large-granularity variable switching device 440 based on the setting notice (step S470), by which the failure recovery is performed. Subsequently, whenever a failure occurs, the operations at steps S460 and S470 are sequentially performed.

Next, when (m−k)-fold failures occur (step S500), the backup path predesign I/F 452 included in the optical node device 402 requires the optical network management device 300 to calculate backup path settings in the event of (m+1)-fold failures (step S510). Here, "k" represents an integer larger than or equal to 0 and less than m. The value of "k" can be determined taking into account the time required to set backup paths and the capacity of memory installed in each optical node device. By recalculating backup path settings at the time when the number of failures reaches (m−k), the communication blackout can be avoided.

At this time, the optical network management device 300 calculates patterns of failure occurrence with respect to the optical path that has been allocated to the optical node device 402 (step S520). After that, the route and the wavelength slot of the remaining backup path without suffering a failure are calculated for the possible pattern of failure occurrence (step S530). In this case, the route and the wavelength slot of the backup path by which the number of required wavelength slots based on a multiple-failures-case bandwidth guaranteed rate can be secured, among backup path resources, are calculated.

The subsequent operations are the same as the operations at step S440 to step S470. Specifically, the optical network management device 300 notifies the backup path predesign I/F 452 included in the optical node device 402 of the settings of the optical path for multiple failure recovery. The backup path predesign I/F 452 causes the backup path setting DB 451 to store the optical path settings. The backup path switching control unit 430 changes the settings of the bandwidth variable optical transponders 420 and the large-granularity variable switching device 440 based on the backup path setting that fits a corresponding pattern of failure occurrence, by which the failure recovery is performed.

If an optical path setting is changed by adding a new optical path or deleting an optical path, or restoration, the optical network management device 300 appropriately notifies the backup path setting management unit 450 included in each optical node of the changed optical path setting. Then the backup path setting management unit 450 updates the backup path setting DB 451.

As mentioned above, the optical communication system 300 according to the present example embodiment has a configuration in which the optical node device 402 includes the backup path setting management unit 450. This makes it possible to set quickly a backup path in case of multiple failures unaffected by a delay in the optical network management device 300.

As described above, in the optical communication system 3000 according to the present example embodiment, the backup paths are dispersedly disposed on a plurality of physical routes that do not overlap with each other. If failures simultaneously occur on a plurality of physical routes, the damaged backup paths are accommodated by reducing the number of wavelength slots for backup paths in accordance with the multiple-failures-case bandwidth guaranteed rate. This makes it possible to achieve fault recovery in case of multiple failures without decreasing the usage efficiency of the optical network. As a result, communication blackout can be prevented.

The present invention has been described by taking the example embodiments mentioned above as model examples. However, the present invention is not limited to the above-mentioned example embodiments. Various modes that can be understood by those skilled in the art can be used within the scope of the present invention.

This application is based upon and claims the benefit of priority from the Japanese Patent Application No. 2014-195303, filed on Sep. 25, 2014, the disclosure of which is incorporated herein in its entirety by reference.

REFERENCE SIGNS LIST 1000, 2000 Optical communication system
100, 300 Optical network management device
110 Optical path setting means
120 Failure-case optical path setting means
200, 401 to 406 Optical node device
210 Optical transceiver means
310 Database unit
311 Demanded traffic DB
312 Network facility DB
313 Optical path management DB
314 Multiple-failures-case bandwidth guaranteed rate DB
320 Optical path design unit
321 Route search unit
322 Wavelength slot/fiber allocating decision unit
323 Multiple-failures-case wavelength-slot-count decision unit
330 Optical path allocation control unit
410 Fault detection unit
420 Bandwidth variable optical transponder
421 Client interface
422 Bandwidth variable unit
423 Optical transceiver
430 Backup path switching control unit
440 Large-granularity variable switching device
450 Backup path setting management unit
451 Backup path setting DB
452 Backup path predesign I/F

The invention claimed is:

1. An optical communication system, comprising:
an optical network management device including
an optical path setting unit configured to set, to a physical route differing from each other, a backup path corresponding to each of a plurality of active paths on an identical physical route, and
a failure-case optical path setting unit configured to set a failure-case backup path with a compressed band of the backup path, to a physical route without a failure in a case where failures arising on more than one physical route among the physical routes; and
an optical node device including an optical transceiver configured to transmit and receive optical signals using failure-case backup path information resulting from setting by the failure-case optical path setting unit.

2. The optical communication system according to claim 1,
wherein the optical network management device includes an optical path allocation control unit configured to notify the optical node device of the failure-case backup path information, and
the optical node device includes a failure-case backup path information accepting unit configured to accept the failure-case backup path information.

3. The optical communication system according to claim 1,
wherein the optical node device includes a failure-case backup path information recording unit configured to record the failure-case backup path information in advance, and
the optical transceiver transmits and receives optical signals using the failure-case backup path information recorded in the failure-case backup path information recording unit.

4. The optical communication system according to claim 1,
wherein the optical path setting means unit sets a plurality of backup paths for each of the plurality of active paths to physical routes having substantially equal communication quality.

5. The optical communication system according to claim 1,
wherein the failure-case optical path setting unit compresses a bandwidth of the backup path based on a bandwidth guaranteed rate under multiple failures.

6. An optical network management device, comprising:
an optical path setting unit configured to set, to a physical route differing from each other, a backup path corresponding to each of a plurality of active paths on an identical physical route; and
a failure-case optical path setting unit configured to set a failure-case backup path with a compressed band of the backup path, to a physical route without a failure in a case where failures arising on more than one physical route among the physical routes.

7. The optical network management device according to claim 6, further comprising an optical path allocation control unit configured to notify the optical node device of the failure-case backup path information.

8. The optical network management device according to claim 6,
wherein the optical path setting unit sets a plurality of backup paths for each of the plurality of active paths to physical routes having substantially equal communication quality.

9. The optical network management device according to claim 6,
wherein the failure-case optical path setting unit compresses a bandwidth of the backup path based on a bandwidth guaranteed rate under multiple failures.

10. An optical path setting method, comprising:
setting, to a physical route differing from each other, a backup path corresponding to each of a plurality of active paths on an identical physical route; and
setting a failure-case backup path with a compressed band of the backup path, to a physical route without a failure in a case where failures arising on more than one physical route among the physical routes.

11. The optical path setting method according to claim 10,
wherein the setting of the backup path to the physical route differing from each other includes setting a plurality of backup paths for each of the plurality of active paths to physical routes having substantially equal communication quality.

12. The optical path setting method according to claim 10,
wherein the setting of the failure-case backup path includes compressing a bandwidth of the backup path based on a bandwidth guaranteed rate under multiple failures.

13. The optical communication system according to claim 2,
wherein the optical path setting unit sets a plurality of backup paths for each of the plurality of active paths to physical routes having substantially equal communication quality.

14. The optical communication system according to claim 3,
wherein the optical path setting unit sets a plurality of backup paths for each of the plurality of active paths to physical routes having substantially equal communication quality.

15. The optical communication system according to claim 2,
wherein the failure-case optical path setting unit compresses a bandwidth of the backup path based on a bandwidth guaranteed rate under multiple failures.

16. The optical communication system according to claim 3,
wherein the failure-case optical path setting unit compresses a bandwidth of the backup path based on a bandwidth guaranteed rate under multiple failures.

17. The optical communication system according to claim 4,
wherein the failure-case optical path setting unit compresses a bandwidth of the backup path based on a bandwidth guaranteed rate under multiple failures.

18. The optical network management device according to claim 7,
wherein the optical path setting unit sets a plurality of backup paths for each of the plurality of active paths to physical routes having substantially equal communication quality.

19. The optical network management device according to claim 7,
wherein the failure-case optical path setting unit compresses a bandwidth of the backup path based on a bandwidth guaranteed rate under multiple failures.

20. The optical network management device according to claim 8,
wherein the failure-case optical path setting unit compresses a bandwidth of the backup path based on a bandwidth guaranteed rate under multiple failures.

\* \* \* \* \*